United States Patent
Griffin

(10) Patent No.: US 8,179,376 B2
(45) Date of Patent: May 15, 2012

(54) TOUCH-SENSITIVE DISPLAY WITH CAPACITIVE AND RESISTIVE TOUCH SENSORS AND METHOD OF CONTROL

(75) Inventor: Jason Tyler Griffin, Waterloo (CA)

(73) Assignee: Research In Motion Limited, Waterloo (CA)

( * ) Notice: Subject to any disclaimer, the term of this patent is extended or adjusted under 35 U.S.C. 154(b) by 341 days.

(21) Appl. No.: 12/548,533

(22) Filed: Aug. 27, 2009

(65) Prior Publication Data

US 2011/0050619 A1 Mar. 3, 2011

(51) Int. Cl.
*G06F 3/045* (2006.01)
(52) U.S. Cl. ......... 345/173; 345/175; 345/174; 345/157
(58) Field of Classification Search .................... 345/173
See application file for complete search history.

(56) References Cited

U.S. PATENT DOCUMENTS

| 5,777,607 | A | | 7/1998 | Koolen | |
|---|---|---|---|---|---|
| 5,801,682 | A | | 9/1998 | Coni et al. | |
| 5,825,352 | A | * | 10/1998 | Bisset et al. | 345/173 |
| 6,222,528 | B1 | * | 4/2001 | Gerpheide et al. | 345/173 |
| 6,492,979 | B1 | | 12/2002 | Kent et al. | |
| 6,822,640 | B2 | * | 11/2004 | Derocher | 345/173 |
| 7,151,532 | B2 | * | 12/2006 | Schulz | 345/173 |
| 2001/0013855 | A1 | * | 8/2001 | Fricker et al. | 345/156 |
| 2003/0214486 | A1 | * | 11/2003 | Roberts | 345/173 |
| 2004/0027339 | A1 | * | 2/2004 | Schulz | 345/173 |
| 2009/0135162 | A1 | * | 5/2009 | Van De Wijdeven et al. | 345/175 |
| 2009/0194341 | A1 | | 8/2009 | Nousiainen | |
| 2010/0085303 | A1 | * | 4/2010 | Kwok et al. | 345/157 |
| 2010/0085314 | A1 | * | 4/2010 | Kwok | 345/173 |
| 2010/0201812 | A1 | * | 8/2010 | McGibney et al. | 348/143 |
| 2011/0037725 | A1 | * | 2/2011 | Pryor | 345/174 |

FOREIGN PATENT DOCUMENTS

| EP | 2026179 | | 2/2009 |
|---|---|---|---|
| EP | 2026179 | A | 2/2009 |
| GB | 2456311 | A | 7/2009 |
| JP | 09-231006 | | 9/1997 |

OTHER PUBLICATIONS

EESR issued Jan. 8, 2010, against corresponding European Patent Application No. 09168793.9.
Korean Patent Application No. 10-2010-0077870, English Translation of Office Action dated Sep. 30, 2011.

* cited by examiner

*Primary Examiner* — Van Chow
(74) *Attorney, Agent, or Firm* — Geoffrey deKleine; Borden Ladner Gervais LLP

(57) ABSTRACT

A method includes detecting a touch via a capacitive touch-sensor of a touch-sensitive display, detecting the touch via a resistive touch-sensor of the touch-sensitive display, determining characteristics of the touch from the capacitive touch sensor and the resistive touch sensor, and performing a function based on the characteristics.

11 Claims, 4 Drawing Sheets

TOUCH-SENSITIVE DISPLAY WITH CAPACITIVE AND RESISTIVE TOUCH SENSORS AND METHOD OF CONTROL

FIELD OF TECHNOLOGY

The present disclosure relates to portable electronic devices, including but not limited to touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
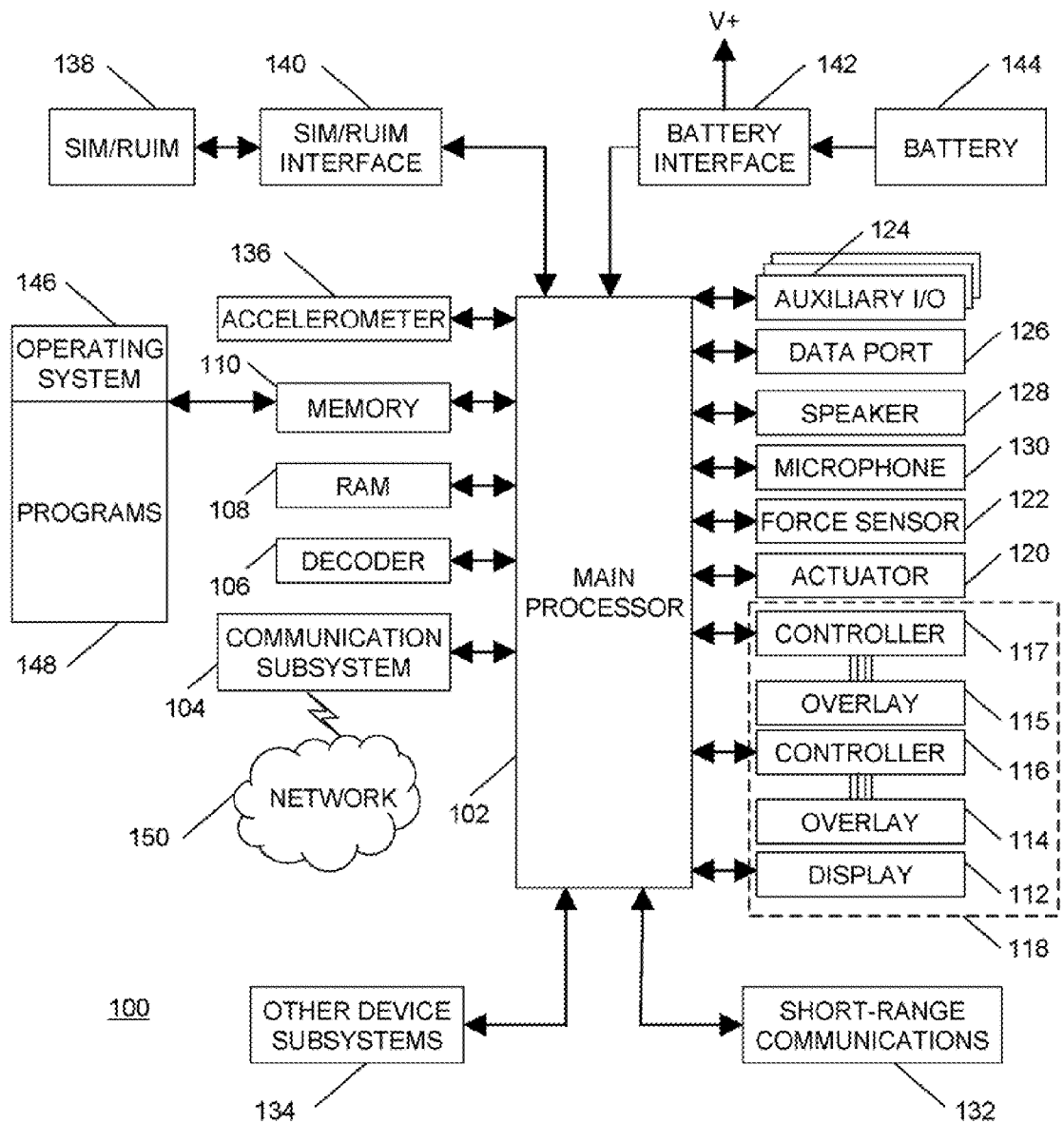
FIG. 1 is a block diagram of a portable electronic device in accordance with the present disclosure.

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities such as a handheld electronic game device, digital photograph album, digital camera, or other device.

A block diagram of an example of an embodiment of a portable electronic device 100 is shown in FIG. 1. The portable electronic device 100 includes multiple components such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support voice and data communications over the same physical base stations. The portable electronic device 100 is a battery-powered device and includes a battery interface 142 for receiving one or more rechargeable batteries 144.

The processor 102 interacts with additional subsystems such as a Random Access Memory (RAM) 108, memory 110, a display 112 with a resistive touch-sensitive overlay 114 connected to an electronic controller 116 and a capacitive touch-sensitive overlay 115 connected to an electronic controller 117 that together comprise a touch-sensitive display 118, an actuator 120, a force sensor 122, an auxiliary input/output (I/O) subsystem 124, a data port 126, a speaker 128, a microphone 130, short-range communications 132 and other device subsystems 134. User-interaction with a graphical user interface (GUI) is performed through the touch-sensitive overlay. The processor 102 interacts with the touch-sensitive overlay 114 via the electronic controller 116 and with the touch-sensitive overlay 115 via the electronic controller 117. Information, such as text, characters, symbols, images, icons and other items that may be displayed or rendered on a portable electronic device, is displayed on the touch-sensitive display 112 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into memory 110.

The portable electronic device 100 also includes an operating system 146 and software components 148 that are executed by the processor 102 and are typically stored in a persistent updatable store such as memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is substantially similar except that the received signals are output to the speaker 128 and signals for transmission are generated by the microphone 130.

Figure 2:
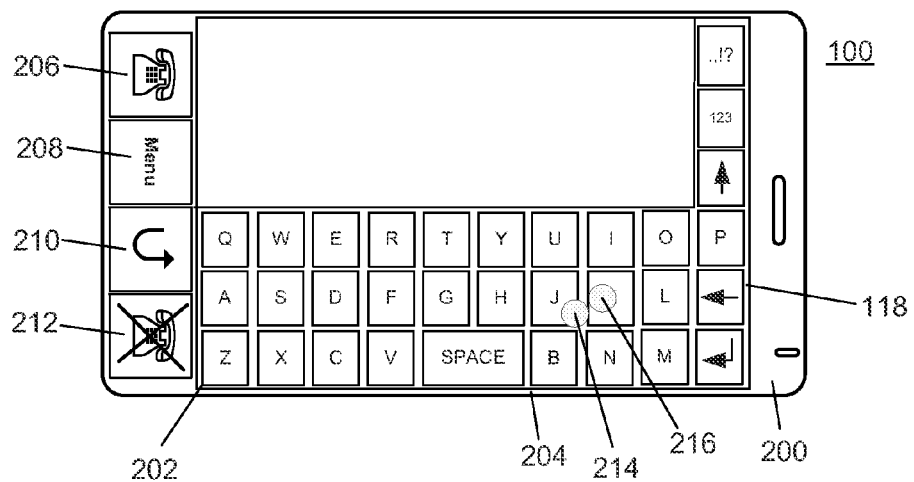
FIG. 2 illustrates an example of information rendered on a touch-sensitive display before detecting a touch location utilizing a capacitive touch sensor and a resistive touch sensor in accordance with the present disclosure.
Figure 3:
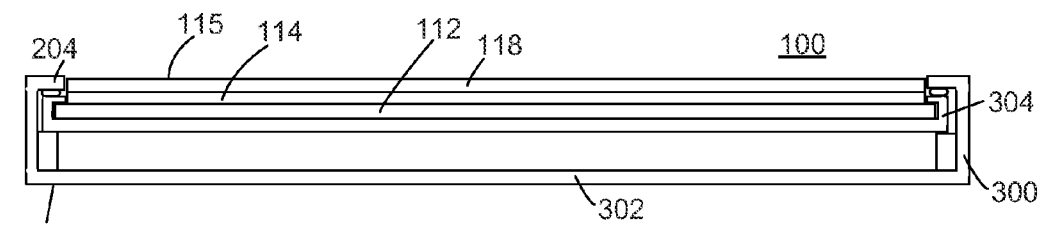
FIG. 3 is a sectional side view of the portable electronic device in accordance with the present disclosure.

An example of a portable electronic device 100 is illustrated in FIG. 2 and FIG. 3. The portable electronic device 100 includes a housing 200 that encloses the components shown in FIG. 1 and includes a frame 204 and sidewalls 300 that extend between the frame 204 and a back 302. The frame 204 surrounds the touch-sensitive display 118. In the example shown in FIG. 2, the touch-sensitive display 118 displays the virtual keyboard 202 for input of data in the form of, for example, letters, numbers, punctuation marks, spaces, control characters (e.g., tab, line break, section break, and so forth), symbols, and so forth, as well as functions (e.g., enter, alt, ctrl). Although a full virtual keyboard 202 is shown, the present disclosure is also applicable to other keyboards including other full keyboards or reduced keyboards. In this example, the portable electronic device 100 includes four additional buttons 206, 208, 210, 212 for selection to perform functions or operations.

The touch-sensitive display 118 is supported on a support tray 304 of suitable material, such as magnesium, to provide mechanical support.

Whereas a single overlay including capacitive and resistive sensors may be utilized, two separate overlays, one including the resistive touch-sensitive overlay 114 and one including the capacitive touch-sensitive overlay 115, are utilized in this example. One or more touches, also known as touch contacts or touch events, may be detected by the touch-sensitive display 118 and processed by the processor 102, for example, to determine a location of a touch.

The resistive touch-sensitive overlay 114 includes resistive touch sensors that are separated by an air gap and insulating dots. The resistive touch sensors may be disposed on a rigid substrate of suitable material such as glass or acrylic and may be protected by a protective cover, e.g., polyester film. The outer touch sensor and protective cover are flexible to facilitate contact of the touch sensors when a force is applied to the touch-sensitive display 118, for example, by a user pressing on the protective cover.

When the force applied to the touch-sensitive display 118 exceeds the force threshold that causes the resistive touch sensors to contact each other, a touch is detected via the resistive touch-sensitive overlay 114 and the resistive touch-sensitive controller 116. The resistive location 216 of the touch is determined utilizing the resistive touch sensors of the resistive touch-sensitive overlay 114. The resistive touch sensors effectively determine the center of the force of the touch. The force threshold that causes the resistive touch sensors to contact each other is known.

The capacitive touch-sensitive overlay 115 includes capacitive touch sensors separated by a barrier. The overlay may also include a substrate, a ground shield, a barrier on which one of the capacitive touch sensors is disposed, and a cover disposed on the other capacitive touch sensor.

A touch on the touch-sensitive display 118 may be detected via the capacitive touch-sensitive overlay 115 and the capacitive touch-sensitive controller 117. The capacitive location 214 of the touch is determined utilizing the capacitive touch sensors of the touch-sensitive display 118. The capacitive touch sensors effectively determine the center of the contact area of the touch. Other characteristics of the touch on the touch-sensitive display 118 may also be determined. For example, the size and the shape of the contact area associated with the touch on the touch-sensitive display 118 may be determined in addition to the location based on the signals received at the capacitive touch-sensitive controller 117 from the capacitive touch sensors.

Figure 4:
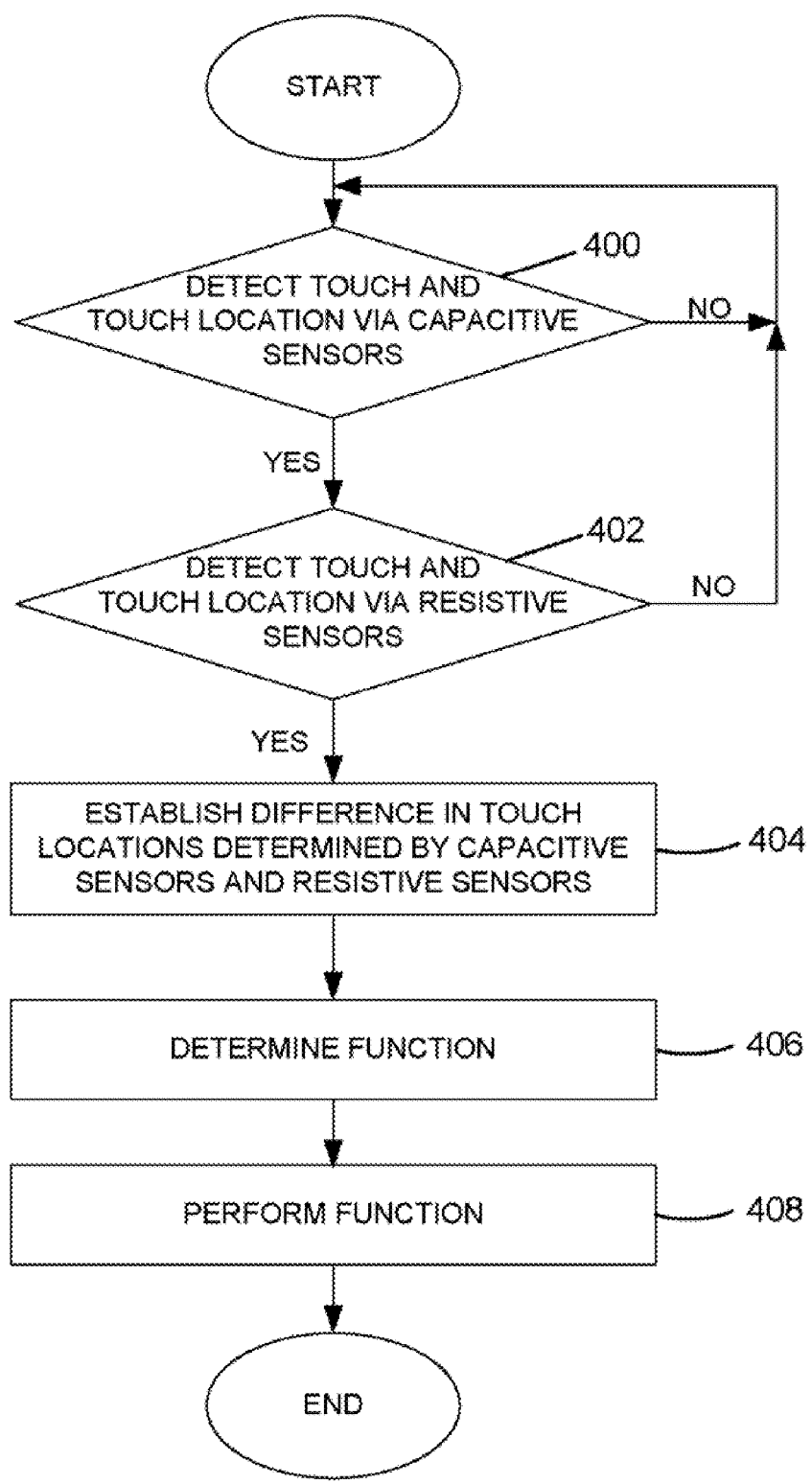
FIG. 4 is a flowchart illustrating a method of controlling an electronic device in accordance with the present disclosure.

A flowchart illustrating a method of controlling an electronic device is shown in FIG. 4. The steps of the method may be carried out by software executed by the processor 102. Coding of software for carrying out such steps is within the scope of a person of ordinary skill in the art given the present disclosure.

A touch on the touch-sensitive display 118 is detected 400 via the capacitive touch-sensitive overlay 115 and the capacitive touch-sensitive controller 117. The capacitive location 214 of the touch is determined utilizing the capacitive touch sensors of the touch-sensitive display 118.

When the touch is detected 402 via the resistive touch-sensitive overlay 114, the resistive location 216 of the touch is determined.

The locations 214, 216 may differ and the difference between the capacitive location 214 and the resistive location 216 is established 404. The difference may include a magnitude and a direction between the locations 214, 216.

The difference in locations 214, 216 established at step 404 may depend on how the portable electronic device 100 is held, the finger touching the touch-sensitive display 118, and the distance that the user reaches across the device to select a feature displayed on the touch-sensitive display 118. This difference between the locations 214, 216 provides information relating to the use of the portable electronic device 100. For example, the finger touching the touch-sensitive display 118 may be conjectured. For example, when a finger from one hand touches the touch-sensitive display 118 while the portable electronic device 100 is held in the other hand or with the portable electronic device placed on a surface such as a table, very little difference between the locations 214, 216 is likely to be present. When, the right thumb or finger touches the touch-sensitive display 118 while the portable electronic device 100 is held in the right hand, the resistive location is likely to be above and to the left of the capacitive location. When the left thumb or finger touches the touch-sensitive display 118 while the portable electronic device 100 is held in the left hand, the location of the resistive location 216 is likely to be above and to the right of the capacitive location 214, such as shown in FIG. 2. References such as above or to the left or right are describe the perspective of a viewer and have no further limiting effect. A function may be determined 406 based on the difference in the locations 214, 216 and the function is performed 408.

Figure 5:
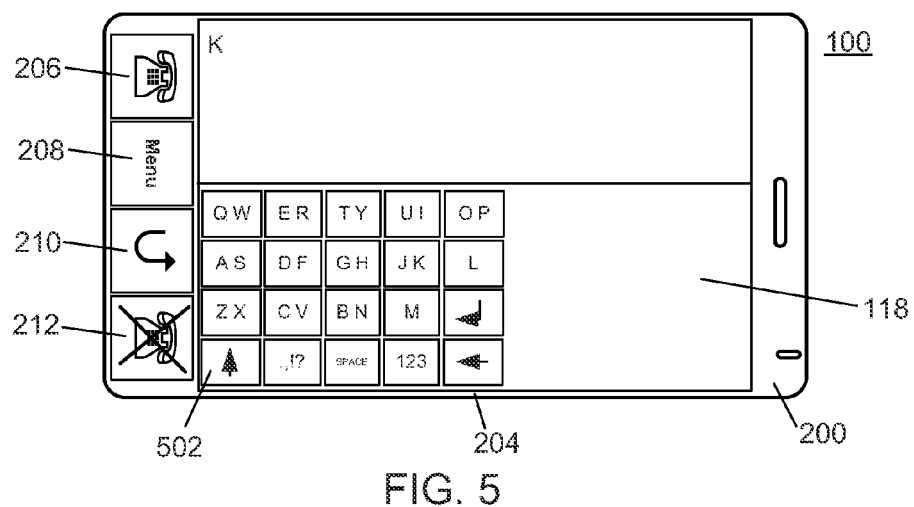
FIG. 5 illustrates an example of information rendered on a touch-sensitive display after detecting a touch location utilizing a capacitive touch sensor and a resistive touch sensor in accordance with the present disclosure.

FIG. 2 and FIG. 5 illustrate an example of information rendered on a display before and after detecting a touch location utilizing a capacitive touch sensor and a resistive touch sensor. In this example, an application, such as a messaging application, including display of a virtual keyboard, is executed by the portable electronic device 100.

As shown in FIG. 2, the capacitive location 216 is above and to the right of the resistive location 214. From the difference of these locations 214, 216, the user may be typing with the left thumb or finger while holding the portable electronic device 100 in the left hand. Based on the difference between the locations 214, 216, a new virtual keyboard 502 is rendered. The information, in the form of keys of the keyboard 502, is displayed closer to the left side of the portable electronic device 100 to accommodate selection using the left thumb in this example. Although the virtual keyboard 502 in this example is a reduced keyboard, other keyboards may be utilized.

Although a keyboard 500 is rendered on the left side of the display in this example, other selectable information, such as icons or other information, may be rearranged based, at least in part, on the difference in touch locations 214, 216 determined by the resistive and the capacitive touch sensors. The location of other information, including non-selectable information such as displayed data, may also be changed to reduce the chance of the data being obscured by the hand or thumb during use of the device 100.

In other embodiments, the function may be the determination of information associated with the touch based on the difference in touch locations. Thus, where the locations determined via the resistive and capacitive touch sensors differ and are not co-located in an area associated with information, a selection may be made based on the difference.

The embodiment shown in FIG. 4 and described above is simplified for the purpose of the present disclosure. Further steps may be included in the process. In other embodiments, the function performed may be based on differences in capacitive location and resistive location of several touches. For example, the keyboard 500 may be rendered after the number of detected touches exceeds a threshold. The function performed may be based on the difference between the locations for a plurality of touches.

Figure 6:
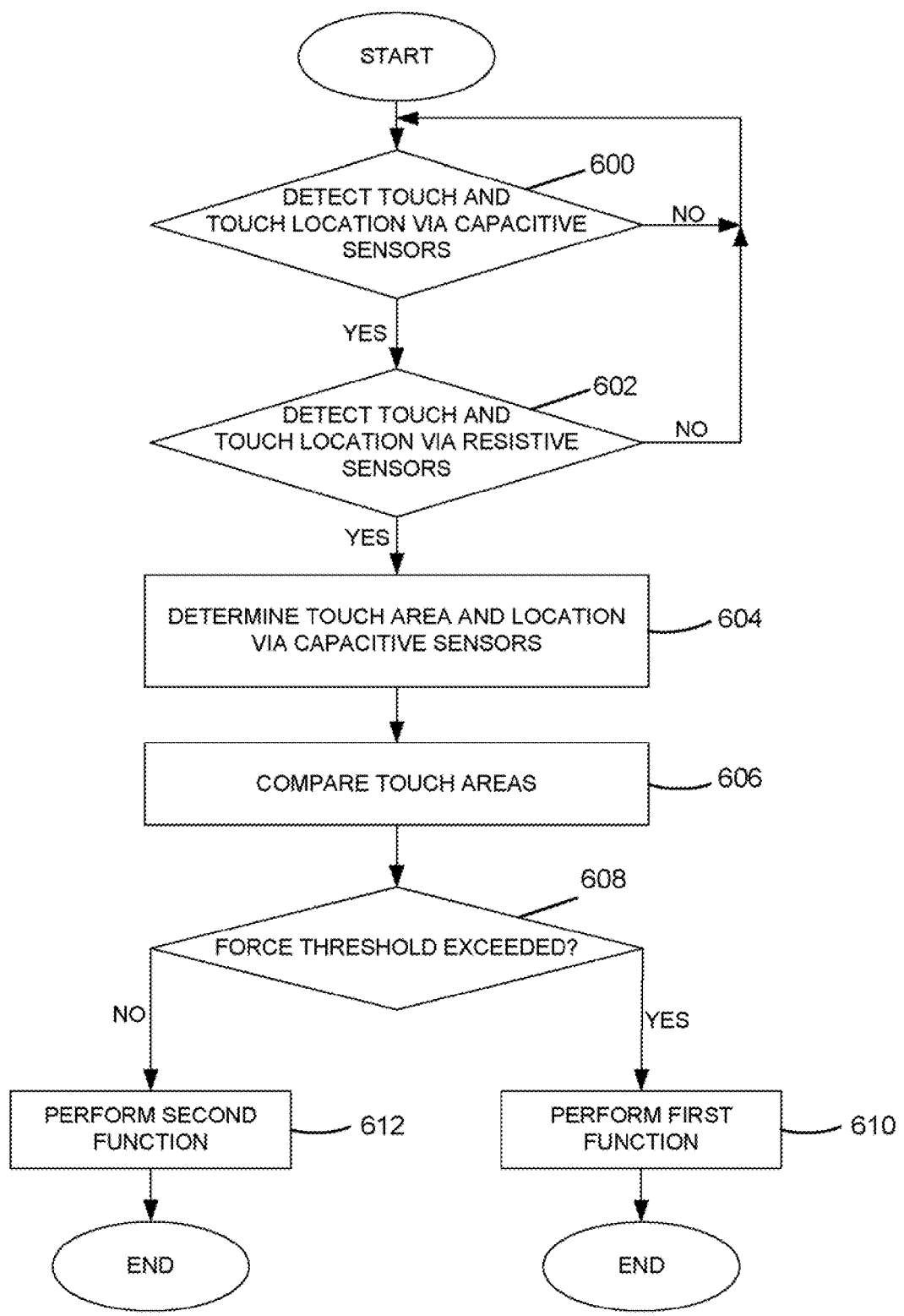
FIG. 6 is a flowchart illustrating an alternative embodiment of a method of controlling an electronic device in accordance with the present disclosure.

FIG. 6 is a flowchart illustrating a method of controlling an electronic device in accordance with another embodiment. The method may be carried out by software executed by the processor 102. Coding of software for carrying out such a method is within the scope of a person of ordinary skill in the art given the present description.

When a touch on the touch-sensitive display 118 is detected 600 via the capacitive touch-sensitive overlay 115, the capacitive location 214 of the touch is determined.

When the touch is detected 602 via the resistive touch-sensitive overlay 114, the resistive location 216 of the touch is determined by the resistive touch sensors and characteristics of the touch are periodically determined 604 via the capacitive touch sensors. The characteristics determined may include the size of the touch area, which is the measurement or estimate of the area of contact with the touch-sensitive display 118.

The size of the touch area at the time the touch is first detected via the resistive touch sensors is compared 606 to the size of the touch area during the touch. The relative increase in the size of the touch area is determined.

An increase in the size of the touch area may be a result of an increase in force applied to the touch-sensitive display 118. The force applied to the touch-sensitive display 118 may be estimated based on the size of the touch area when the touch is first detected and the increase in the size of the touch area at a later time during the touch. Thus, the increase in size of the touch area may be correlated to an increase in the force applied to the touch-sensitive display 118. An area threshold may be set based on a force applied to the touch-sensitive display 118. The processor 102 may determine 608 whether or not a force threshold is exceeded based on a comparison of the increase in the size of the touch area to the area threshold.

The function performed is based on whether or not the increase in the size of the touch area exceeds the area threshold. If the increase in size of the touch area exceeds the area threshold, a first function is performed 610. If the increase in size of the touch area does not exceed the area threshold, a second function is performed 612.

For example, a touch on the touch-sensitive display 118 is detected on a map rendered on the display 112. The location of the touch is determined 600 via the capacitive touch-sensitive overlay 115 and the capacitive touch-sensitive controller 117. The location of touch is also detected 602 via the resistive touch-sensitive overlay 114 and the resistive touch-sensitive controller 116. When the touch is first detected via the resistive touch sensors, characteristics of the touch are determined 604 via the capacitive touch sensors. The characteristics include the size of the touch area.

The size of the touch area determined during the touch is compared 606 to the size of the touch area when the touch is first detected, and the increase in the size of the touch area is determined. In this example, a relative increase in size of greater than twenty percent (20%) is determined. The relative increase in size of the touch area is determined 608 to be greater than the area threshold and, for example, a zooming operation is performed 610 to zoom in or zoom out at the location of the touch as determined, for example, via the resistive touch sensors. If the threshold force is not exceeded, the map may be centered by rendering the map with the touch location centered on the display 112.

In another example, the portable electronic device 100 may focus in a camera application when the touch is first detected via the resistive touch sensors. The portable electronic device 100 may capture an image when the force threshold is exceeded, and the image may be rendered on the display 112.

Other functions may be performed. For example, a scrolling or panning speed may be varied when selecting a scrolling arrow on the touch-sensitive display 118. Many other functions may also be performed.

The embodiments shown and described with reference to FIG. 4 and FIG. 6 may also be combined to determine a difference in the touch locations as well as to determine when a force threshold is exceeded. The function performed may be dependent on the difference in the touch location and whether or not the force threshold is exceeded.

A method includes detecting a touch via a capacitive touch-sensor of a touch-sensitive display, detecting the touch via a resistive touch-sensor of the touch-sensitive display, determining characteristics of the touch from the capacitive touch sensor and the resistive touch sensor, and performing a function based on the characteristics.

A computer-readable medium has computer-readable code executable by at least one processor of a portable electronic device to perform the above method.

An apparatus includes a touch-sensitive display including a display device and touch-sensitive overlay disposed on the display device. The touch-sensitive overlay includes a capacitive touch sensor configured to detect a touch and a resistive touch sensor configured to detect the touch when a force threshold is exceeded. The apparatus also includes a processor operatively connected to the touch-sensitive display and configured to determine characteristics of the touch from the capacitive touch sensor and the resistive touch sensor, and perform a function based on the characteristics of the touch.

Advantageously, characteristics of a touch are determined from resistive touch sensors and capacitive touch sensors of a touch-sensitive overlay, facilitating, for example, determination of information relating to use of the device. For example, a determination of the hand holding the device and/or the finger/thumb selecting information on the touch-sensitive display may be made. Force applied to the touch-sensitive display may be determined. The functions performed by the electronic device may be dependent on the characteristics of the touch as determined based on the detection of the touch at the capacitive and the resistive touch sensors. Information displayed on a touch-sensitive display may be positioned based on the use.

While the embodiments described herein are directed to particular implementations of the portable electronic device and the method of controlling the portable electronic device, modifications and variations may occur to those skilled in the art. All such modifications and variations are believed to be within the sphere and scope of the present disclosure. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   detecting a touch via a capacitive touch sensor of a touch-sensitive display;
   detecting the touch via a resistive touch sensor of the touch-sensitive display;
   determining characteristics of the touch from the capacitive touch sensor and the resistive touch sensor by determining, utilizing the capacitive touch sensor, a first touch area when the touch is detected by the resistive touch sensor and determining whether a force threshold is exceeded based on a comparison of a second touch area to the first touch area;
   performing a function based on the characteristics.

2. The method according to claim 1, wherein determining characteristics of the touch comprises establishing a difference in a touch location determined utilizing the capacitive touch sensor and a touch location determined utilizing the resistive touch sensor.

3. The method according to claim 2, wherein determining characteristics of the touch comprises determining a magnitude of the difference and a direction of the difference.

4. The method according to claim 1, wherein performing the function comprises arranging information on the touch-sensitive display.

5. The method according to claim 1, wherein performing a function comprises identifying selectable information and performing an associated function.

6. The method according to claim 1, wherein performing a function comprises identifying and entering a character from a virtual keyboard.

7. The method according to claim 1, wherein performing a function comprises zooming in response to detecting that a force threshold is exceeded.

8. The method according to claim 1, wherein performing a function comprises performing a first function when the touch is detected utilizing the resistive touch sensor and performing a second function when a force threshold is exceeded.

9. A non-transitory computer-readable medium having computer-readable code executable by at least one processor of a portable electronic device to perform the method of claim 1.

10. An apparatus comprising:
    a touch-sensitive display comprising a display, and touch-sensitive overlay disposed on the display, the touch-sensitive overlay including a capacitive touch sensor configured to detect a touch and a resistive touch sensor configured to detect the touch when a force threshold is exceeded;
    a processor operatively coupled to the touch-sensitive display and configured to determine characteristics of the touch from the capacitive touch sensor and the resistive touch sensor by determining, utilizing the capacitive touch sensor, a first touch area when the touch is detected by the resistive touch sensor and determining whether a force threshold is exceeded based on a comparison of a second touch area to the first touch area, and perform a function based on the characteristics of the touch.

11. A portable electronic device comprising the apparatus of claim 10.

* * * * *